H. SCHNECKLOTH.
BORING TOOL.
APPLICATION FILED NOV. 7, 1916.
1,233,813.
Patented July 17, 1917.
2 SHEETS—SHEET 2.
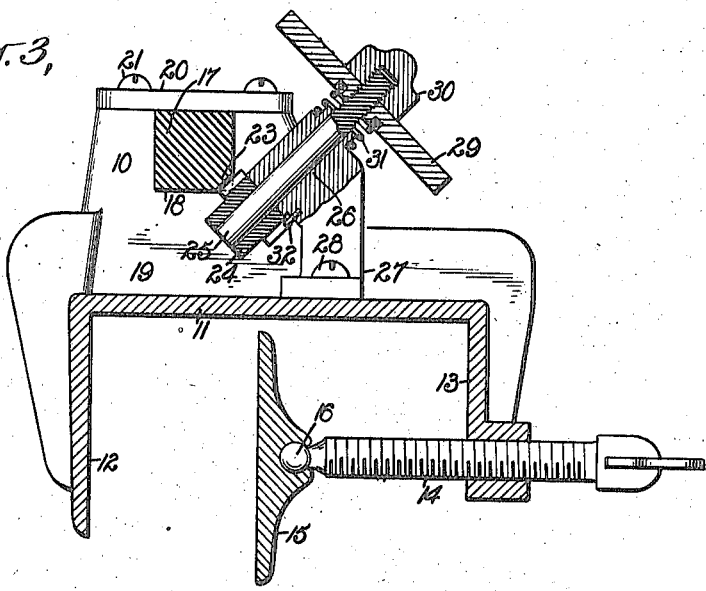
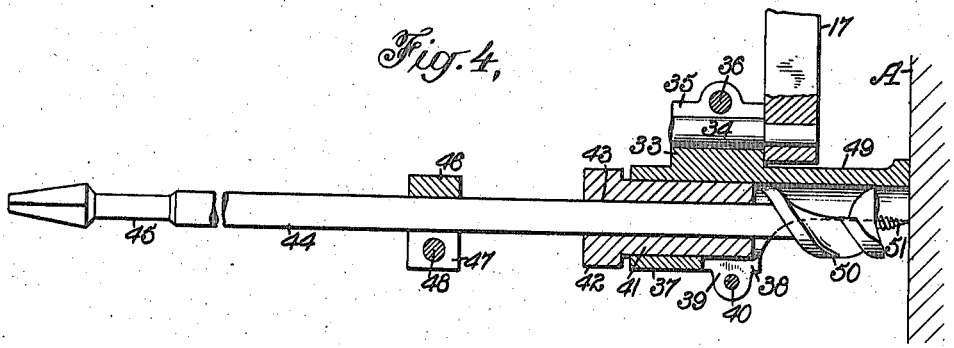
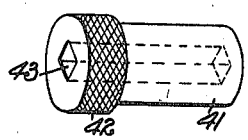
WITNESSES
INVENTOR
Henry Schneckloth
BY
ATTORNEYS

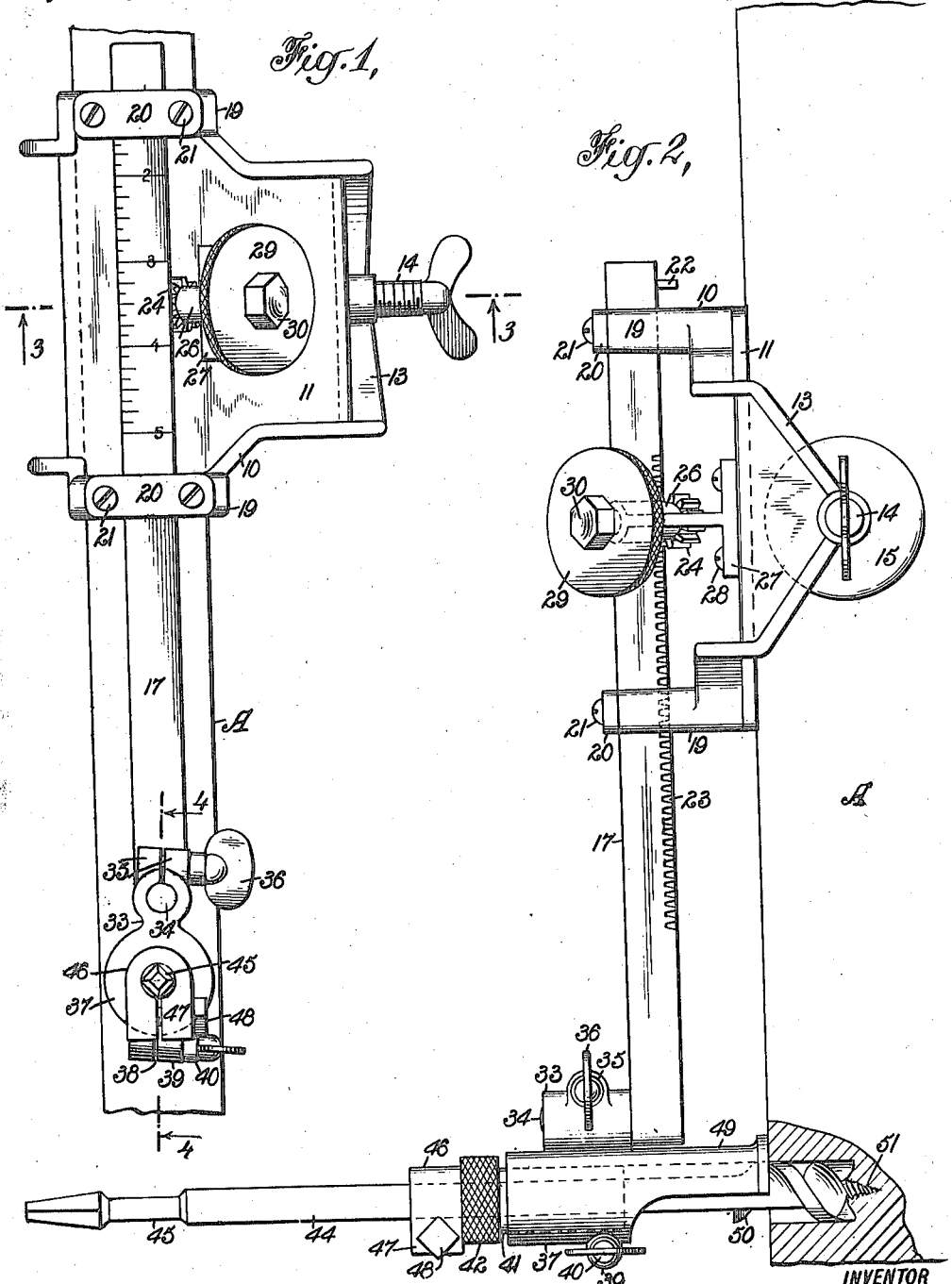

UNITED STATES PATENT OFFICE.

HENRY SCHNECKLOTH, OF HOLSTEIN, IOWA.

BORING-TOOL.

1,233,813.    Specification of Letters Patent.    Patented July 17, 1917.

Application filed November 7, 1916. Serial No. 129,965.

*To all whom it may concern:*

Be it known that I, HENRY SCHNECK-LOTH, a citizen of the United States, and a resident of Holstein, in the county of Ida and State of Iowa, have invented a new and Improved Boring-Tool, of which the following is a full, clear, and exact description.

My invention is more particularly intended for the mortising in of door locks, doweling, and like work although useful for other boring.

General objects of the invention are to provide a convenient and effective boring tool of very simple construction that may be readily applied to the piece of work; to provide a bit-carrying means that may be adjusted with accuracy and facility for properly positioning the bit; and to provide for quickly shifting the position of the bit and its carrying means for successive borings in the piece of work without bodily shifting the complete tool.

A more specific object of the invention is to provide a novel bit, and a novel headstock therefor having effective guiding means to prevent the bit from running out of true.

The invention will be particularly explained in the specific description following. Reference is to be had to the accompanying drawings forming a part of this specification in which similar reference characters indicate corresponding parts in all the views.

Figure 1 is a side elevation of a boring tool embodying my invention, showing the same applied to a piece of work;

Fig. 2 is a side elevation thereof;

Fig. 3 is a horizontal section on the line 3—3, Fig. 1;

Fig 4 is a transverse vertical section on the line 4—4, Fig. 1;

Fig. 5 is a perspective view of the headstock bushing.

In carrying out my invention in accordance with the illustrated example, a frame designated generally by the numeral 10 has a face plate 11 adapted to lie, for example, against the edge A of a door to be mortised. Projecting forwardly from the frame at one side of the face plate 11 is a vertically disposed clamp flange 12, while at the opposite side of the face plate a forwardly disposed bracket 13 is produced rigid with the frame 10. The bracket 13 is threaded to receive a clamp screw 14 carrying a clamp head 15 to co-act with the flange 12 in clamping the work A. The head 15 is preferably secured to the screw 14 by a ball and socket connection 16.

A tool carrier bar 17 is movable vertically in the frame 10 and has guided movement in alined openings 18 formed in upper and lower guide members 19 which are produced on the frame at the back of the face plate 11. The carrier bar 17 is rectangular in cross section or otherwise made non-circular so as to be held against turning, and the openings 18 are similarly formed, said openings being three-sided and extending to the rear edges of the guide members 19. The bar is retained in the openings 18 by caps 20 secured by screws 21 or the like to the rear edges of the members 19.

The downward movement of the bar 17 in the guides 19 is limited by a stop pin 22 on said bar.

To raise and lower the tool carrying bar 17, the same is formed with a vertical row of rack teeth 23 at an angle of the said bar, and meshing with the said rack teeth is a pinion 24 on a spindle 25. The spindle 25 is slidably and revolubly mounted in a bearing 26 provided on the frame 10, the bearing being preferably formed by a bracket 27 secured by screws 28 to the rear side of the face plate 11.

On the outer end of the spindle 25 a handwheel 29 is threaded and secured by a cap nut 30. Surrounding the spindle 25 between the handwheel 29 and the bracket 27 is a compression spring 31. The arrangement permits of the spindle 25 being moved longitudinally to move the pinion 24 to or from the adjacent end of the bearing 26 without disengaging the said pinion from the rack teeth 23. A locking stud or pin 32 projects from the bracket 27 at the bearing 26 sufficiently to be received between adjacent teeth of the pinion 24 when the latter is in the retracted position against the bracket. When the spindle is moved longitudinally to disengage the pinion from the pin 32, the spindle and pinion may be turned to raise and lower the bar 17. A scale as shown in Fig. 1 is produced on the bar 17 to indicate the extent of movement.

A headstock designated generally by the numeral 33 is carried by the bar 17 at the lower end. To secure the headstock a transverse pin 34 is provided on the bar 17, and the headstock has a split bearing 35 fitted with a clamp screw 36, whereby the headstock may be swung laterally and firmly secured in a given position. The headstock 33 includes a sleeve 37 slotted longitudinally for a portion of its length as at 38, there being clamp ears 39 at said slot receiving a clamp screw 40. The sleeve 37 is fitted with a bushing 41 having a knurled head 42 for turning the same and having a through-bore 43 which may be round or square according to the cross section of the shank 44 of a bit 45. In using a bit with a round shank the same may turn in the bushing 41, the said bushing being clamped tightly in the sleeve 37 by the clamp screw 40. With a bit having a square shank, the screw 40 will be loosened to permit the bushing 41 to turn with the bit.

A depth gage 46 is provided in the form of a sleeve split at one side as at 47 and provided with a screw 48 to bind the depth gage at any desired distance from the front of the bit. The contact of the depth gage 46 with the rear end of the bushing 41 will arrest the forward movement of the bit.

The forward portion 49 of the headstock 33 is arched, that is, it is semi-circular in cross section leaving an opening at the under side. The front end of the arched portion 49 is adapted to abut against the face of the work. In order to prevent the bit from running out of true I form the auger portion 50 thereof very short, so that the portion of the shank guided by the bushing 41 will extend comparatively close to the point 51 of the bit. In using the tool, the same having been clamped to the door A or other piece of work, the bit will be retracted until the auger portion thereof including the point 51 is beneath the arched abutting member 49, the rear end of the auger portion contacting with the front end of the bushing 41. For the cutting of a mortise the carrier bar 17 is moved to the extreme lower position and one hole having been bored and the bit withdrawn, the bar is raised to position the bit for boring a second hole complementary to the first, and successive holes are similarly bored. After the first hole is produced the chips of the second hole will be directed downwardly into the first hole, the chips in the successive holes being received in the holes previously formed.

Having thus described my invention I claim as new, and desire to secure by Letters Patent:

1. A boring tool including a frame, means to clamp the same to a piece of work, a vertically disposed carrier bar slidable vertically on the frame at the front, means on the frame and engaging said bar to raise and lower the same, a transverse headstock pivotally mounted on said carrier bar at the lower end thereof to swing sidewise relatively to said bar, said headstock extending rearwardly beyond the carrier bar and terminating at its rear end in a plane to abut endwise against a piece of work when the latter is engaged by the clamp means, a bushing fitting in said headstock at the front portion thereof and having a through-bore, a bit having a shank fitting said bushing and having an auger portion in front of the bushing, said bit being movable in the bushing to a retracted position to bring the auger portion within the said rear end of the headstock and with the rear end of the auger portion in contact with the front end of the bushing, and clamp means on the headstock to tightly bind the said bushing or to release the bushing to permit the bushing to turn with the bit.

2. A boring tool including a frame, means to clamp the same to a piece of work, a vertically disposed carrier bar having guided vertical movement on the frame at the front and depending below the frame, means to raise and lower the said bar, a headstock transversely disposed on the carrier bar at the lower end and mounted to swing sidewise relatively to said bar, said headstock extending rearwardly beyond the said bar and terminating at its rear end in a plane to abut endwise against a piece of work when the latter is held by the clamp means, said headstock having means to receive a boring bit.

3. A boring tool including a frame, means to clamp the same to a piece of work, a vertically disposed carrier bar slidable on the frame, means to raise and lower said bar, a headstock transversely disposed on the bar at the lower end and pivotally mounted to swing sidewise thereon, said headstock extending rearwardly beyond the carrier bar and terminating at its rear end in a plane to abut endwise against the piece of work when the latter is engaged by the clamp means, a bushing fitting in said headstock at the front portion thereof, and a bit having a shank fitting said bushing to move longitudinally therein, said bit having a short auger portion in front of the bushing adapted to be withdrawn within the plane of the front end of the headstock in the retracted position of the bit.

4. A boring tool including a frame, means to clamp the same to a piece of work, a vertically disposed carrier bar having guided vertical movement on the frame at the front and depending below the frame, means to raise and lower said bar, a transversely disposed headstock on the carrier bar at the lower end, and a bushing in said headstock at the front portion thereof, the said headstock extending rearwardly beyond said bushing and beyond said carrier bar.

5. A boring tool including a frame, means to clamp the same to a piece of work, a vertically disposed carrier bar having guided vertical movement on the frame at the front and depending below the frame, means to raise and lower said bar, a transversely disposed headstock on the carrier bar at the lower end, and a bushing in said headstock adapted to receive a boring bit, the said headstock extending rearwardly beyond said bushing and beyond said carrier bar; together with means on the headstock adapted to tightly bind the said bushing or to release the bushing to permit the same to turn with the bit.

6. A boring tool including a frame, means to clamp the same to a piece of work, a vertically disposed carrier bar having guided vertical movement on the frame at the front, means to raise and lower the said bar, a headstock transversely disposed on the carrier bar at the lower end and extending rearwardly beyond said bar, the rear terminal of the headstock being in a plane to abut endwise against the piece of work when the latter is held by the clamp means, and a boring bit turnable in the headstock.

7. A boring tool including a frame having a face plate adapted to bear against a piece of work to be bored, a clamp on said frame at the back of the face plate to clamp the frame to the piece of work, a vertically disposed carrier bar having guided vertical movement on the frame at the front, means on said bar to receive a boring bit, said bar having a vertical rack, a pinion engaging said rack, means revolubly mounting the pinion on the frame, and means to lock the pinion against turning movement.

8. A boring tool including a frame having a face plate adapted to bear against a piece of work to be bored, a clamp on said frame at the back of the face plate to clamp the frame to the piece of work, a vertically disposed carrier bar having guided vertical movement on the frame at the front, means on said bar to receive a boring bit, said bar having a vertical rack, a bearing on said frame, a spindle in said bearing, a pinion rigid with said spindle and meshing with said rack, a handwheel on said spindle, a spring on said spindle, the spindle being slidable in its bearing against the tension of the spring to move the pinion to or from the adjacent end of the bearing, and a stop pin on the bearing receivable between adjacent teeth of the pinion to prevent the pinion from turning, the said spring tending to maintain the pinion and pin in locked engagement.

9. A boring tool including a frame, means to clamp the same to a piece of work, a vertically disposed carrier bar having guided vertical movement on the frame at the front, means to raise and lower the said bar, a headstock transversely disposed on the carrier bar at the lower end and extending rearwardly beyond said bar, the rear terminal of the headstock being in a plane to abut endwise against the piece of work when the latter is held by the clamp means, a boring bit turnable in the headstock, and a depth gage adjustable on the shank of the bit, in the rear of the headstock.

HENRY SCHNECKLOTH.